United States Patent
Apshankar et al.

(10) Patent No.: US 11,012,570 B2
(45) Date of Patent: May 18, 2021

(54) MANAGING A PLURALITY OF TOPICS IN A USER INTERACTION THROUGH A PLURALITY OF AGENTS IN A CONTACT CENTER

(71) Applicant: Avaya Inc., Santa Clara, CA (US)

(72) Inventors: Harshad Apshankar, Pune (IN); Valentine C. Matula, Granville, OH (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/259,059

(22) Filed: Jan. 28, 2019

(65) Prior Publication Data

US 2020/0244807 A1    Jul. 30, 2020

(51) Int. Cl.
*H04M 3/523* (2006.01)
*H04M 3/51* (2006.01)
*H04L 12/58* (2006.01)

(52) U.S. Cl.
CPC ........ *H04M 3/5235* (2013.01); *H04L 51/046* (2013.01); *H04M 3/5141* (2013.01); *H04M 3/5175* (2013.01); *H04M 3/5233* (2013.01)

(58) Field of Classification Search
CPC . H04M 3/5235; H04M 3/5141; H04M 3/5233
USPC .................................................... 379/265.09
See application file for complete search history.

(56) References Cited

U.S. PATENT DOCUMENTS

| | | | |
|---|---|---|---|
| 7,349,529 B2 | 3/2008 | Hollatz et al. | |
| 7,870,204 B2 * | 1/2011 | LeVasseur | H04L 51/22 |
| | | | 709/206 |
| 8,234,141 B1 | 7/2012 | Flockhart et al. | |
| 8,634,543 B2 | 1/2014 | Flockhart et al. | |
| 9,654,640 B1 * | 5/2017 | Brydon | H04M 3/5233 |

OTHER PUBLICATIONS

Hardshad Apshankar et al. Related U.S. Appl. No. 17/205,321 entitled "Managing a Plurality of Topics in a User Interaction Through a Plurality of Agents in a Contact Center", filed Mar. 18, 2021.

* cited by examiner

Primary Examiner — Ahmad F. Matar
Assistant Examiner — Jirapon Intavong
(74) Attorney, Agent, or Firm — Stevens & Showalter LLP

(57) ABSTRACT

A computer-implemented process includes receiving an incoming contact at a contact center from a user; identifying a plurality of different portions of the incoming contact, each of a plurality of portions associated with a respective topic; and for each of the different portions, routing that different portion to a respective agent of the contact center based on its associated respective topic. Furthermore, the process includes receiving a respective response from one or more of the respective agents, the respective response pertaining to the different portion routed to that agent; combining the respective response from the one or more of the respective agents to form a first composite response; and forwarding the first composite response to the user.

20 Claims, 6 Drawing Sheets

MANAGING A PLURALITY OF TOPICS IN A USER INTERACTION THROUGH A PLURALITY OF AGENTS IN A CONTACT CENTER

BACKGROUND

The present disclosure relates generally to a contact center environment, and, more particularly, to managing digital contacts pertaining to multiple topics.

When a user is interacting with the contact center seeking information or support, there might be multiple topics that the user needs help with. For example, there may be a) multiple questions within a single email sent by the user, b) multiple questions asked by the user within a single text (chat/sms) session, or c) multiple questions/comments posted by a user within a single social media conversation.

Conventionally, an incoming contact reaches a single agent deemed to be most appropriate to handle such a digital contact based on the contact center routing rules or business logic. However, that agent may not always be equipped with all the required information or supporting data to successfully handle all the topics as part of the same contact. As a result, the agent is likely to consult with a supervisor, other agents or subject matter experts or use transfer or consult features so that the topics which the agent is not equipped to address can be addressed by other agents/supervisor/SMEs.

BRIEF SUMMARY

One aspect of the present invention relates to a computer-implemented process, that includes receiving, by a computer, an incoming contact at a contact center from a user; identifying, by the computer, a plurality of different portions of the incoming contact, each of a plurality of portions associated with a respective topic; and for each of the different portions, routing, by the computer, that different portion to a respective agent of the contact center based on its associated respective topic. Furthermore, the method includes receiving, by the computer, a respective response from one or more of the respective agents, the respective response pertaining to the different portion routed to that agent; combining, by the computer, the respective response from the one or more of the respective agents to form a first composite response; and forwarding, by the computer, the first composite response to the user.

In accordance with this aspect, the incoming contact is one of a chat session, a social media message, a short message service (SMS) message, or an electronic mail.

The method can also include waiting, by the computer, to receive the respective response from each of the one or more respective agents before forming the first composite response. Alternatively, the method can include sending, by the computer, the first composite result before receiving the respective response from each of the one or more respective agents, wherein the one or more respective agents from which a respective response is received form a first subset of agents. Also, subsequent to sending the first composite response, the method can include receiving, by the computer, a respective response from the one or more respective agents that are not members of the first subset of agents; combining, by the computer, the respective response from the one or more respective agents that are not members of the first subset, to form a second composite response; and forwarding, by the computer, the second composite response to the customer.

In accordance with this aspect, the first composite response can include an identification of the respective topic associated with the different portion routed to the one or more respective agents that are not members of the first subset of agents.

In addition, the method can include analyzing, by the computer, each of the respective responses to determine if each respective response is complete and/or analyzing, by the computer, each of the respective responses to determine consistency amongst the respective responses.

Furthermore, in accordance with this aspect, the first composite response includes an identification of a respective topic associated with each respective response combined in the first composite response. Also, the method can include monitoring, by the computer, a respective service level agreement (SLA) associated with each of the routed different portions.

Another aspect of the present invention relates to a system in a contact center that includes a memory storing executable instructions and a processor in communication with the memory. In particular the processor when executing the executable instructions is configured to receive an incoming contact at the contact center from a user; identify a plurality of different portions of the incoming contact, each of a plurality of portions associated with a respective topic; and for each of the different portions, route that different portion to a respective agent of the contact center based on its associated respective topic. Also, the processor when executing the executable instructions is configured to receive a respective response from one or more of the respective agents, the respective response pertaining to the different portion routed to that agent; combine the respective response from the one or more of the respective agents to form a first composite response; and forward the first composite response to the user.

In accordance with this aspect, the incoming contact is one of a chat session, a social media message, a short message service (SMS) message, or an electronic mail.

The processor can also be configured to wait to receive the respective response from each of the one or more respective agents before forming the first composite response. Alternatively, the processor can be configured to send the first composite result before receiving the respective response from each of the one or more respective agents, wherein the one or more respective agents from which a respective response is received form a first subset of agents. Also, subsequent to sending the first composite response, the processor can receive a respective response from the one or more respective agents that are not members of the first subset of agents; combine the respective response from the one or more respective agents that are not members of the first subset, to form a second composite response; and then forward the second composite response to the customer.

In accordance with this aspect, the first composite response can include an identification of the respective topic associated with the different portion routed to the one or more respective agents that are not members of the first subset of agents.

In addition, the processor can be configured to analyze each of the respective responses to determine if each respective response is complete and/or analyze each of the respective responses to determine consistency amongst the respective responses.

Furthermore, in accordance with this aspect, the first composite response includes an identification of a respective topic associated with each respective response combined in the first composite response. Also, the processor can be configured to monitor a respective service level agreement (SLA) associated with each of the routed different portions.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
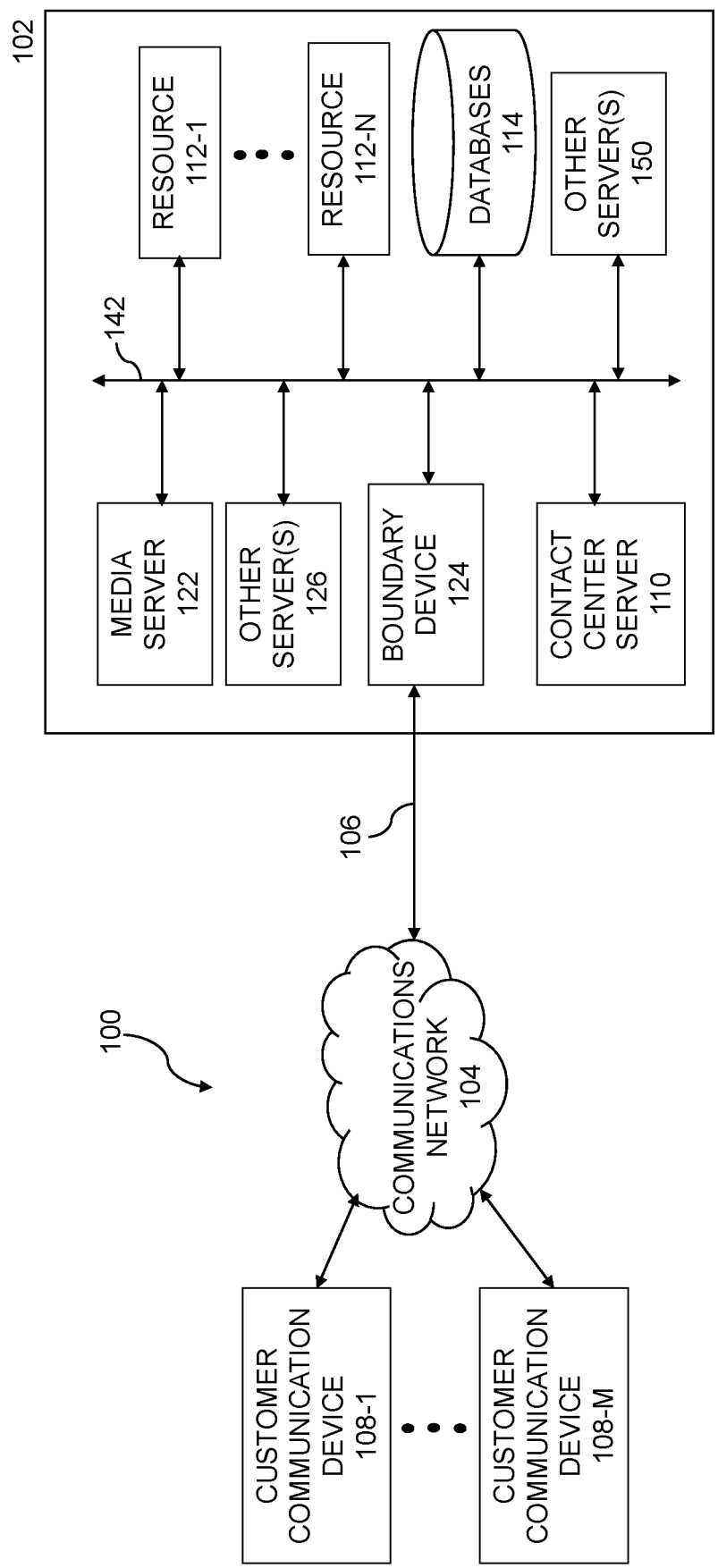
FIG. 1 and FIG. 2 provide an example contact center environment and are provided to illustrate a typical computer-based enterprise architecture in which embodiments in accordance with the present disclosure can be implemented.

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present description, an "agent" and a "resource" can both be used to describe a person working at the contact center handling contacts.

The term "computer readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed. For the sake of brevity, the term "contact" is sometimes used to mean a "contact object" when it is clear from the context that a computer or processor is automatically interacting with or manipulating the contact object.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 2:
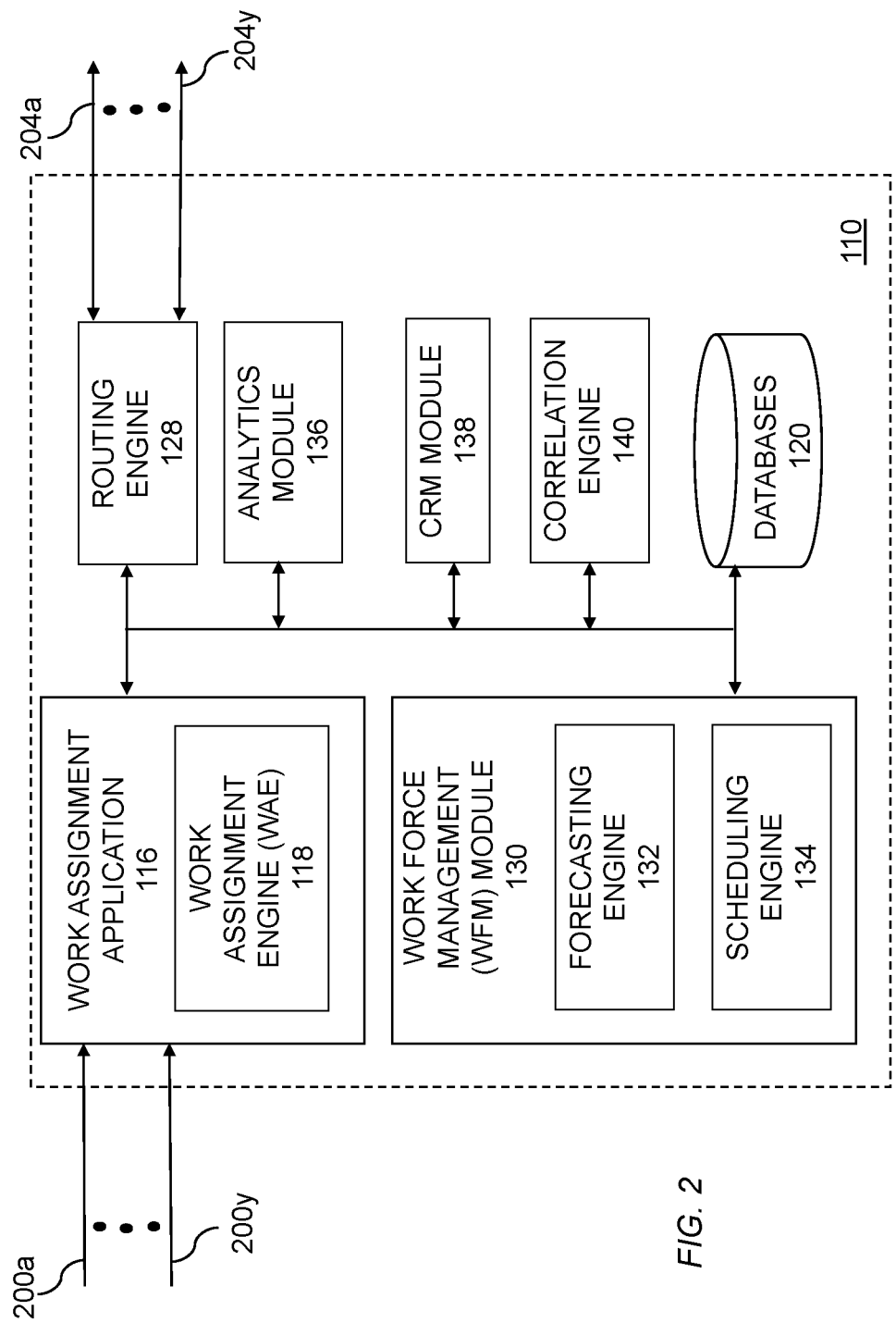

FIG. 1 and FIG. 2 provide an example contact center environment and are provided to illustrate a typical computer-based enterprise architecture in which embodiments in accordance with the present disclosure can be implemented.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communications network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communications device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communications device 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. As described below, the channels of the contact center can comprise multiple different mediums such that an interaction or contact may occur over multiple types of channels. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communications device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the one contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource. Other servers and applications 150 may also be provided within the contact center.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In modern contact centers that provide multiple channels or mediums of communication, customers may want to be able to move from one medium/channel to another seamlessly, without needing to be transferred to another agent and without having to explain the nature of their problem all over again. Accordingly, a customer may be able to send pictures, take live video or text reference numbers mid-session and ensure the same agent receives the additional data 'live' as part of the active session which, thereby, includes voice, video and messaging channels. From the perspective of the agent, the agents are able to pick up the thread of their interaction quickly, without the customer having to explain the nature of their problem from scratch. As used herein, a contact center agent can have "omni" capabilities when that agent can handle multiple channels such as voice, video, social media, email, chat, SMS, etc.

Figure 3A:
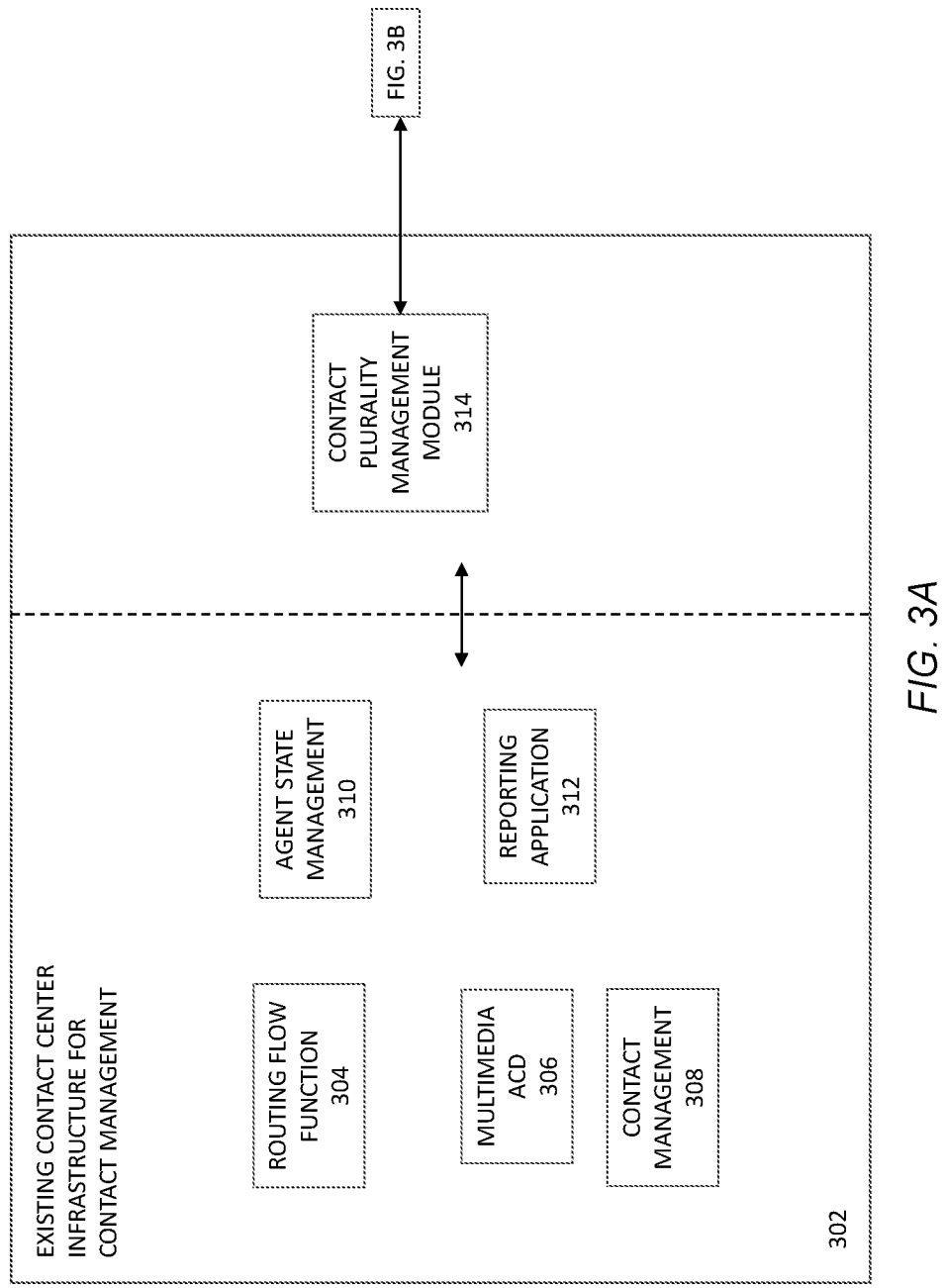
FIG. 3A and FIG. 3B depict an AI based contact plurality management system in accordance with the principles of the present disclosure.

The primary features in the above description of FIGS. 1 and 2 can be summarized in FIG. 3A as block 302 which depicts existing contact center infrastructure for contact management that is part of any modern contact center application or system. Those features include routing flow functionality 302 for routing incoming contacts, a multimedia automatic call distributor 306 that can handle contacts of various modalities, and a module for performing contact management 308 that tracks, stores, and collects information about a contact as it is being routed and handled. Block 302 also depicts a module 310 that manages the state of the agents and a reporting application that collects and stores statistics about the agent's handling of each contact. As explained below, embodiments in accordance with the present disclosure contemplate a contact plurality management module 314 that communicates with the other functions in block 302 in order to handle an incoming digital contact whose subject matter pertains to more than one topic.

As mentioned above, when a user is interacting with the contact center seeking information or support, there might be multiple topics that the user needs help with. For example, there may be a) multiple questions within a single email sent by the user, b) multiple questions asked by the user within a single text (chat/sms) session, or c) multiple questions/comments posted by a user within a single social media conversation.

Conventionally, an incoming contact reaches a single agent deemed to be most appropriate to handle such a digital contact based on the contact center routing rules or business logic. However, that agent may not always be equipped with all the required information or supporting data to successfully handle all the topics as part of the same contact. As a result, the agent is likely to consult with a supervisor, other agents or subject matter experts or use transfer or consult features so that the topics which the agent is not equipped to address can be addressed by other agents/supervisor/SMEs. Alternatively, the agent may advise the user to initiate a separate contact with different topics so that the other topics can get routed to appropriately skilled agents and get addressed by them.

Thus, presently available contact center solutions do not provide a mechanism in which a single digital contact can be worked by multiple agents/SMEs in parallel based on their expertise areas. As a result, as the contact goes through a transfer/consult cycle which is similar to a new contact experience from the user's perspective. For example, for voice contacts, call-conferencing can be used to bring another agent/SME on, provided the agent knows how to reach an expert based on the topic requested by the user. This procedure may be limited by the agent's understanding of the topic(s), identification of an expert and the availability of the expert. However, as explained below, digital contacts with multiple contacts can be handled differently. Digital contacts as used herein refers textual contacts such as from chat, email, social media, and SMS. Additionally, a transcript of an incoming voicemail could be created using speech-to-text and processed as a textual contact as well. Furthermore, as future and additional digital channels are developed and implemented the principles of the present invention can be applied to messages in those channels as well.

In accordance with the principles of the present disclosure, an Artificial-Intelligence (AI) based system is contemplated that includes a contact center application as described above, an AI based detection engine 316 which can identify a plurality of topics in the user contact by parsing the digital contact and applying techniques such as NLP, and an AI based contact plurality management system 318 which can a) create multiple legs for a single contact, with each leg corresponding to each different topic identified within that single contact, b) tag each of the legs with its own respective topic identifier, c) treat each leg similar to a separate contact to pull in multiple agents/SMEs based on the topic and expertise defined by skills/attributes, d) check the responses to separate topics from separate agents/SMEs to validate completeness and/or consistency amongst the responses, e) reconstruct a properly tagged complete/partial response to be sent back to the user, f) keep track of any SLA for response and trigger alerts or reminders for agents and/or supervisors, if necessary, and g) send out a complete/partial response to the user with an indication about topics being worked on within the same digital contact.

Figure 3B:
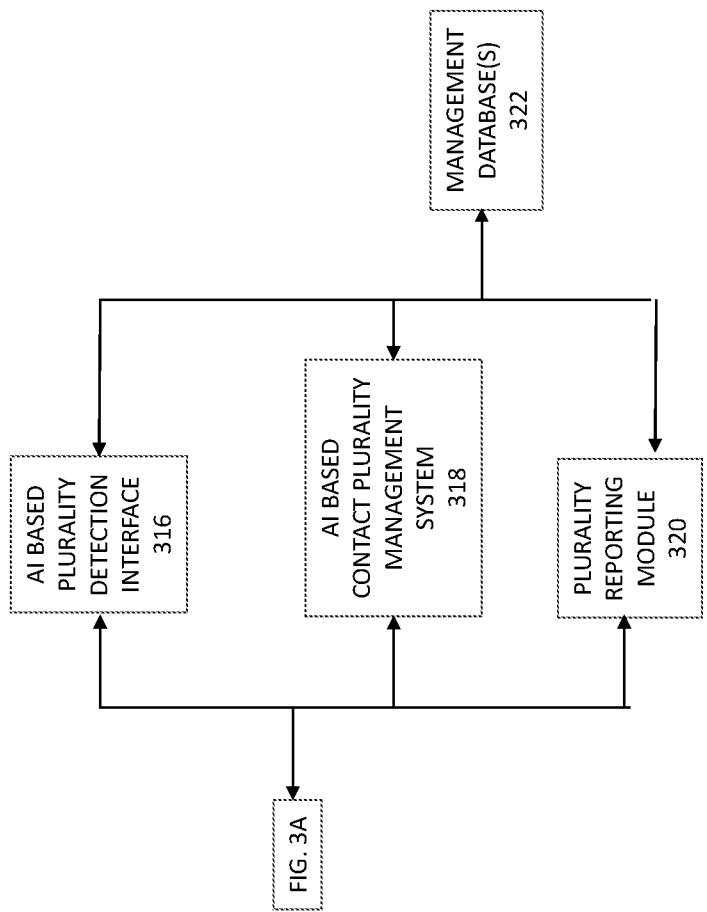

The contemplated system also includes a plurality reporting module 320 which can report on such contacts handled using a plurality of agents/SMEs. A database 322 is also present that stores the information pertinent to the various contacts whose subject matter pertains to multiple topics. Thus, the existing infrastructure and capabilities of an existing contact center system can be augmented to interface with other elements of FIG. 3A and FIG. 3B that permit handling of the multiple topics within a contact.

In the examples described below, the system can utilize any number of conventional and well-understood AI based techniques, algorithms, and procedures. In general, NLP based systems are well understood to detect and understand the intended meaning of a communication received from a user. Grammatical construction, word order, word proximity, whitespace and other features of a transcript can be used to determine the topic or topics within that transcript. Similarly, a response from an agent can be analyzed to determine its completeness at responding to the user's identified topics. Furthermore, the different responses from different agents can be analyzed and compared to determine whether they are consistent with one another. Any problems can be identified before a response is sent to a user and corrected. The contemplated AI systems can be constructed to take advantage of the technology, subject matter or topics likely to arise at a particular contact center. The way the system is trained and the potential outcomes can be customized based on attributes particular to each contact center.

Figure 4A:
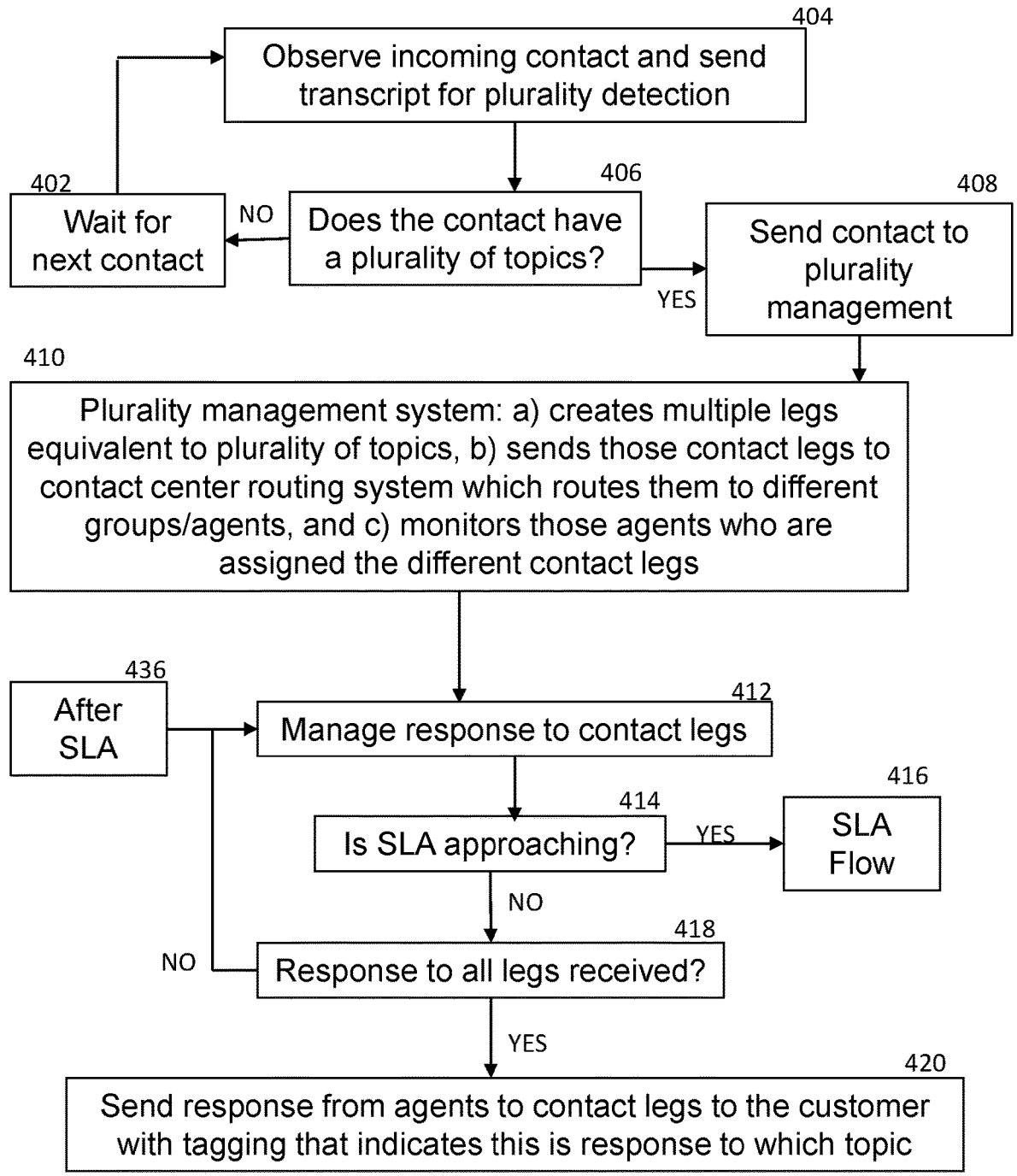
FIG. 4A and FIG. 4B depict a flowchart of an example process in accordance with the principles of the present disclosure.
Figure 4B:
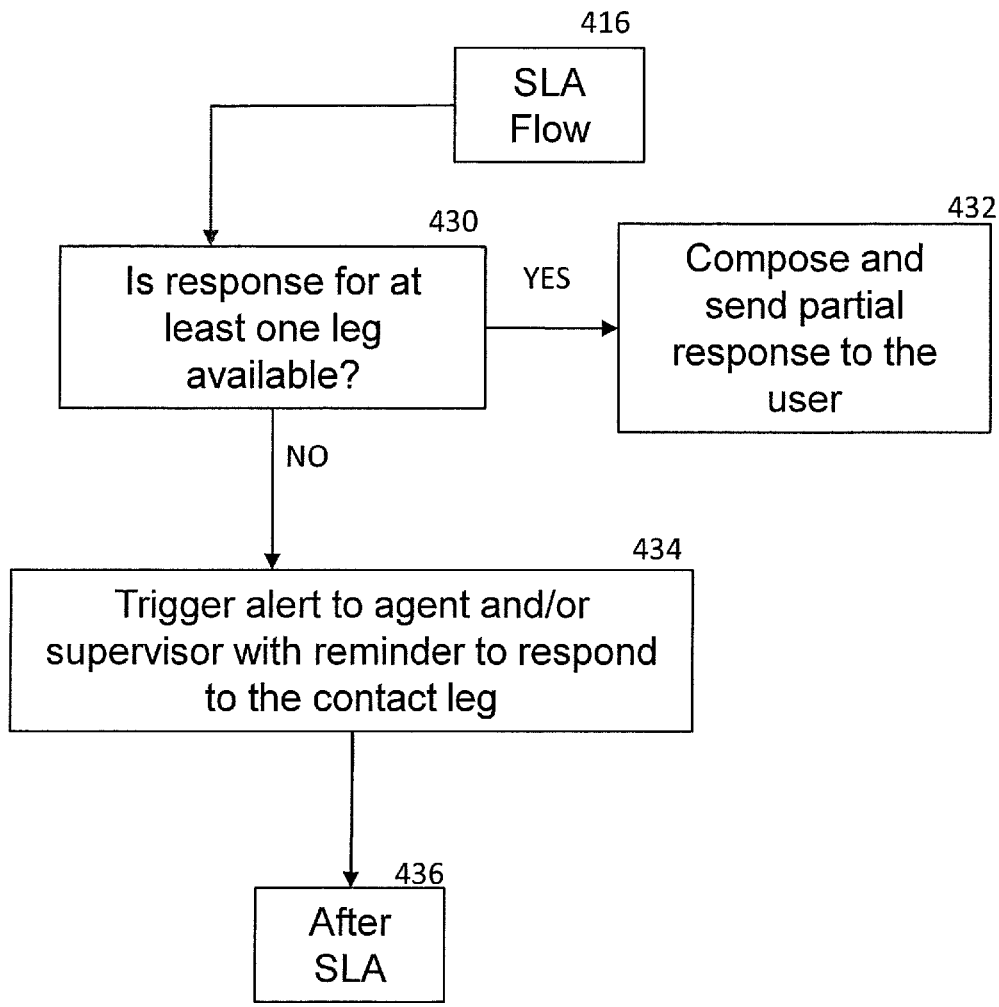

FIG. 4A and FIG. 4B depict a flowchart of an example process in accordance with the principles of the present disclosure. The system waits, in step 402, for a next incoming contact to be received. The contact center application can initially receive the digital contact and then forward the contact through the contact plurality management module 314 to the AI based plurality detection interface 316 in step 404. In step 406, the contact is analyzed to determine whether or not there are multiple topics present in the contact. If yes, then the contact is sent to the plurality management system 318. A contact can have a flag or similar marker attached to identify the contact as having multiple contacts. If a plurality of topics is not present in the contact, then the control flow returns to step 402 to wait for the next contact.

In step 410, the contact plurality management module 318 performs a number of steps. First, multiple legs are created wherein each leg is equivalent to one of the different topics identified in step 406. In one embodiment, the multiple legs of a contact can be created by assigning a sub-identifier to a contact. Thus, there would be an original, or parent, identifier for the contact and each leg would be assigned an additional identifier. In this manner, each leg can be treated, routed and tracked as a distinct contact but the different legs can also be identified as part of the same contact based on the parent identifier. Each leg can also be assigned a tag that identifies its topic. Thus, each of the legs is transformed into what appears to be a contact with a single topic. This allows each leg to be returned to the routing system of the contact center and routed to an agent or SME appropriate for that leg. The information about which agent is assigned a leg can be returned to the contact plurality management system to allow monitoring and tracking of that agent and the agent's response. The existing contact center infrastructure functionality can recognize a contact as a leg or, based on the above-mentioned flag or marker, identify a contact as one with multiple topics. Thus, information about those types of contacts or legs can be handled differently by being communicated or exchanged with the contract plurality management module 314.

In step 412, the contact plurality management system 318 receives responses from the contact center agent in order to manage them. Unlike conventional contacts where the agent response may be sent directly to a user, the present system contemplates treating a contact with a plurality of topics differently such that the response generated by the agent is determined to be for a single leg of a contact. That response can then be provided to the contact plurality management system 318 where the responses to the different legs can be tracked, monitored and managed.

One part of managing the response, as described above, is to analyze and determine the completeness of a response and the consistencies between different responses. If a deficiency is identified, then an alert or other message can be transmitted to the agent that composed the troublesome response. Thus, inconsistencies or incompleteness can be corrected before the information is provided to a user.

One part of managing the responses involves tracking service level agreement (SLA) information. Thus, in step 414, the system determines whether an SLA for any of the responses is approaching. The term "approaching" can be based on the SLA data. For example, the determination about "approaching" for a response that is intended to be supplied within an hour would be handled differently than the determination for a response intended to be supplied within 3 days. Modern contact centers have manager-settable variables that are configurable to determine when an agent or supervisor should be sent an alert.

If no SLA is approaching, then a check, in step 418, is made whether a response to all the legs have been received. If so, then a composite response can be constructed that includes each response from the different agents. Each response can also include a tag that identifies its respective topic. This composite response can then be sent to the user to conclude the contact.

If not all of the responses have been received, then the control flow can return to step 412.

In step 414, if it was determined that an SLA was approaching, then flow continues to FIG. 4B with step 416. In step 430, a determination is made if at least one response has been received and is available to send to the user. If so, then in step 432, the system composes and sends a partial composite response to the user that includes the responses that are available. The response that is sent to the user can include a separate topic tag associated with each of the responses. In one embodiment, the response sent to the user can also include an identification of those topics which have yet to be responded to.

In step 434, an alert to an agent or supervisor can be triggered which provides a reminder to respond to a contact leg. Step 434 is reached after a partial composite response is sent to the user in step 432 or when it is determined that not a single response is available in step 430.

In step 436 control flow then returns to FIG. 4A by returning to step 412 to manage the responses to the contact legs.

An example flow with a sample use case for a social media channel is listed below. There can be many such use cases and variations in the flow as per the specific use case requirements.

EXAMPLE

Customer Harshad is reporting issues through Dell Twitter account. The request includes 3 different topics:
1. Incomplete shipment received.
2. One of the parts received is faulty.
3. Need more quantity of one of the parts due to change in requirements.

The Dell Contact Center has 2 different departments:
1. Orders Dept. (new or incremental orders), and
2. Shipment Dept. (taking care of shipment issues). Also within shipment department, there are separate agent groups taking care of incomplete shipment (Short shipment) and faulty parts (Replacements) as per their expertise.

In this case, a contemplated flow can be:
1. Twitter message sent by Harshad is received by Dell Contact Center social media management system.
2. AI based plurality detection interface identifies that there are 3 topics in this Twitter message pertaining to 2 departments and 3 groups and flags the social media message to be handled by AI based plurality management system.
3. AI based contact plurality management system upon seeing the flagged social media message:
  a) Creates 3 legs and remodels them as 3 different social media messages,
  b) Sends those 3 legs to 3 different agents through the contact center routing system,
  c) Monitors agents handling those legs, their supervisor and provides alerts, SLAs, etc. to track progress,
  d) Upon receiving a response from one or more agents, validates the information for consistency and completeness. If any inconsistencies are identified or if a response to a leg is not considered to be complete, then alerts and messages can be exchanged with agents and supervisors to ensure any problems are addressed and corrected,
  e) Consolidates the response to reconstruct a single email response back to the customer, and
  f) Sends the reconstructed response to the contact center social media management system to be sent out to the customer.
4. The Plurality Reporting Module (see FIG. 3B, element 320) then tracks and reports the progress of the social media message such as:
  a) The time the social message was split into 3 legs, transformed into 3 messages,
  b) Routing of the transformed social message to agents, handling SLAs, agent and/or supervisor alerts,
  c) Transfer, quality assurance and any other processing of the transformed social messages,
  d) The time the social message consolidated response is reconstructed using responses from 3 agents and any inconsistencies observed, and
  e) The time the social message response is sent to the customer.

In summary, a contact having a plurality of topics to be addressed in digital contacts can be handled through a plurality of agents/SMEs as if they were handling separate contacts. Once the responses are received from the agents, a consolidated/partial response can be reconstructed and sent back to the customer from the contact center.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A computer-implemented process, comprising:
    receiving, by a computer, an incoming contact at a contact center from a user;
    identifying, by the computer, a plurality of different portions of the incoming contact, each of the plurality of different portions associated with a respective topic;
    separating the incoming contact into the different portions, each having a separate identifier;
    for each of the different portions, routing, by the computer, that different portion to a respective agent of the contact center based on the respective topic and separate identifier associated with that different portion;
    receiving, by the computer, a respective response from one or more of the respective agents, the respective response pertaining to the different portion routed to that agent;
    combining, by the computer, the respective response from the one or more of the respective agents to form a first composite response; and
    forwarding, by the computer, the first composite response to the user.

2. The computer-implemented process of claim 1, wherein the incoming contact is one of a chat session, a social media message, a short message service (SMS) message, or an electronic mail.

3. The computer-implemented process of claim 1, further comprising:
    waiting, by the computer, to receive the respective response from each of the one or more respective agents before forming the first composite response.

4. The computer-implemented process of claim 1, further comprising:
    sending, by the computer, the first composite response before receiving the respective response from each of the one or more respective agents, wherein the one or more respective agents from which the respective response is received form a first subset of agents.

5. The computer-implemented process of claim 4, further comprising:
    subsequent to sending the first composite response, receiving, by the computer, a respective response from the one or more respective agents that are not members of the first subset of agents;
    combining, by the computer, the respective response from the one or more respective agents that are not members of the first subset of agents, to form a second composite response; and
    forwarding, by the computer, the second composite response to the user.

6. The computer-implemented process of claim 4, wherein the first composite response comprises an identification of the respective topic associated with the different portion routed to the one or more respective agents that are not members of the first subset of agents.

7. The computer-implemented process of claim 1, further comprising:
    analyzing, by the computer, each of the respective responses to determine if each respective response is complete.

8. The computer-implemented process of claim 1, further comprising:
    analyzing, by the computer, each of the respective responses to determine consistency amongst the respective responses.

9. The computer-implemented process of claim 1, wherein the first composite response includes an identification of the respective topic associated with each respective response combined in the first composite response.

10. The computer-implemented process of claim 1, further comprising:
    monitoring, by the computer, a respective service level agreement (SLA) associated with each of the routed different portions.

11. A system in a contact center, the system comprising:
    a memory storing executable instructions; and
    a processor in communication with the memory, wherein the processor when executing the executable instructions is configured to:
        receive an incoming contact at the contact center from a user;
        identify a plurality of different portions of the incoming contact, each of the plurality of different portions associated with a respective topic;
        separate the incoming contact into the different portions, each having a separate identifier;
        for each of the different portions, route that different portion to a respective agent of the contact center based on the respective topic and separate identifier associated with that different portion;
        receive a respective response from one or more of the respective agents, the respective response pertaining to the different portion routed to that agent;
        combine the respective response from the one or more of the respective agents to form a first composite response; and
        forward the first composite response to the user.

12. The system of claim 11, wherein the incoming contact is one of a chat session, a social media message, a short message service (SMS) message, or an electronic mail.

13. The system of claim 11, wherein when executing the executable instructions the processor is configured to:
    wait to receive the respective response from each of the one or more respective agents before forming the first composite response.

14. The system of claim 11, wherein when executing the executable instructions the processor is configured to:
    send the first composite response before receiving the respective response from each of the one or more respective agents, wherein the one or more respective agents from which the respective response is received form a first subset of agents.

15. The system of claim 14, wherein when executing the executable instructions the processor is configured to:
    subsequent to sending the first composite response, receive a respective response from the one or more respective agents that are not members of the first subset of agents;

combine the respective response from the one or more respective agents that are not members of the first subset of agents, to form a second composite response; and forward the second composite response to the user.

16. The system of claim 14, wherein the first composite response comprises an identification of the respective topic associated with the different portion routed to the one or more respective agents that are not members of the first subset of agents.

17. The system of claim 11, wherein when executing the executable instructions the processor is configured to:
analyze each of the respective responses to determine if each respective response is complete.

18. The system of claim 11, wherein when executing the executable instructions the processor is configured to:
analyze each of the respective responses to determine consistency amongst the respective responses.

19. The system of claim 11, wherein the first composite response includes an identification of the respective topic associated with each respective response combined in the first composite response.

20. The system of claim 11, wherein when executing the executable instructions the processor is configured to:
monitor a respective service level agreement (SLA) associated with each of the routed different portions.

* * * * *